US011488375B2

(12) United States Patent
Wang (10) Patent No.: US 11,488,375 B2
(45) Date of Patent: Nov. 1, 2022

(54) ILLUMINATION COLOR PREDICTION METHOD, IMAGE PROCESSING METHOD, APPARATUS AND STORAGE MEDIUM

(71) Applicant: CANON KABUSHIKI KAISHA, Tokyo (JP)

(72) Inventor: Qiao Wang, Beijing (CN)

(73) Assignee: CANON KABUSHIKI KAISHA, Tokyo (JP)

( * ) Notice: Subject to any disclaimer, the term of this patent is extended or adjusted under 35 U.S.C. 154(b) by 185 days.

(21) Appl. No.: 16/916,941

(22) Filed: Jun. 30, 2020

(65) Prior Publication Data
US 2021/0004631 A1 Jan. 7, 2021

(30) Foreign Application Priority Data
Jul. 2, 2019 (CN) .......................... 201910588967.9

(51) Int. Cl.
*G06V 10/56* (2022.01)
*G06V 10/34* (2022.01)
*G06V 10/50* (2022.01)
*G06V 10/60* (2022.01)
*G06V 10/141* (2022.01)

(52) U.S. Cl.
CPC ............ *G06V 10/56* (2022.01); *G06V 10/141* (2022.01); *G06V 10/34* (2022.01); *G06V 10/50* (2022.01); *G06V 10/60* (2022.01)

(58) Field of Classification Search
CPC ...... G06V 10/56; G06V 10/141; G06V 10/34; G06V 10/50; G06V 10/60; G06V 10/82; G06V 20/68; G06K 9/6271
See application file for complete search history.

(56) References Cited

U.S. PATENT DOCUMENTS

| | | | | |
|---|---|---|---|---|
| 10,665,011 | B1 * | 5/2020 | Sunkavalli | G06T 19/006 |
| 10,692,277 | B1 * | 6/2020 | Sunkavalli | G06K 9/6256 |
| 2005/0117695 | A1 * | 6/2005 | Iisaku | G06T 19/00 |
| | | | | 378/4 |
| 2011/0211732 | A1 * | 9/2011 | Rapaport | G09G 5/06 |
| | | | | 382/173 |
| 2012/0044380 | A1 * | 2/2012 | Imai | H04N 9/735 |
| | | | | 348/E9.051 |
| 2012/0057062 | A1 * | 3/2012 | Hamada | G02B 7/102 |
| | | | | 348/E5.045 |

(Continued)

OTHER PUBLICATIONS

Hu Y., et al., "FC4: Fully Convolutional Color Constancy With Confidence-Weighted Pooling", Proceedings of the IEEE Conference on Computer Vision and Pattern Recognition (CVPR), 2017, pp. 4085-4094.*

(Continued)

*Primary Examiner* — Xuemei G Chen
(74) *Attorney, Agent, or Firm* — Canon U.S.A., Inc. IP Division (57) ABSTRACT

A method for performing illumination color prediction on an image in a neural network model, comprising: inputting an image to the neural network model; extracting a semantic-based illumination color feature of the image and a statistical rule-based illumination color feature of the image; and predicting an illumination color of the image according to the semantic-based illumination color feature and the statistical rule-based illumination color feature.

20 Claims, 4 Drawing Sheets

(56) References Cited

U.S. PATENT DOCUMENTS

| | | | |
|---|---|---|---|
| 2014/0063177 A1* | 3/2014 | Tian | H04N 7/147 |
| | | | 348/E7.083 |
| 2017/0046563 A1* | 2/2017 | Kim | G06V 40/169 |
| 2017/0262962 A1* | 9/2017 | Rad | G06T 5/007 |
| 2018/0253869 A1* | 9/2018 | Yumer | G06T 11/60 |
| 2018/0359416 A1* | 12/2018 | Hold-Geoffroy | G06N 3/08 |
| 2019/0164261 A1* | 5/2019 | Sunkavalli | G06T 5/007 |
| 2020/0042820 A1* | 2/2020 | Zavalishin | G06T 5/002 |
| 2020/0143230 A1* | 5/2020 | Su | G06V 40/164 |
| 2020/0151509 A1* | 5/2020 | Sunkavalli | G06K 9/6262 |
| 2020/0152316 A1* | 5/2020 | Lee | G06K 9/6254 |
| 2021/0006760 A1* | 1/2021 | Mcdonagh | H04N 9/735 |
| 2021/0027526 A1* | 1/2021 | Dong | G06T 17/20 |
| 2021/0235980 A1* | 8/2021 | Oosake | G06V 10/141 |

OTHER PUBLICATIONS

Gijsenij, A., et al., "Color Constancy Using Natural Image Statistics and Scene Semantics", IEEE Transactions On Pattern Analysis and Machine Intelligence, vol. 33, No. 4, pp. 687-698, Apr. 2011.*

Yuanming Hu et al.; "FC4: Fully Convolutional Color Constancy with Confidence-weighted Pooling;" CVPR paper is the Open Access version, provided by the Computer Vision Foundation; 2017; pp. 4085-4094.

* cited by examiner

ILLUMINATION COLOR PREDICTION METHOD, IMAGE PROCESSING METHOD, APPARATUS AND STORAGE MEDIUM

BACKGROUND OF THE INVENTION

Field of the Invention

The aspect of the embodiments relates to an image processing method, and in particularly to a method for performing illumination color prediction on an image, and a method for processing the image based on a prediction result of an illumination color.

Description of the Related Art

Figure 1A:
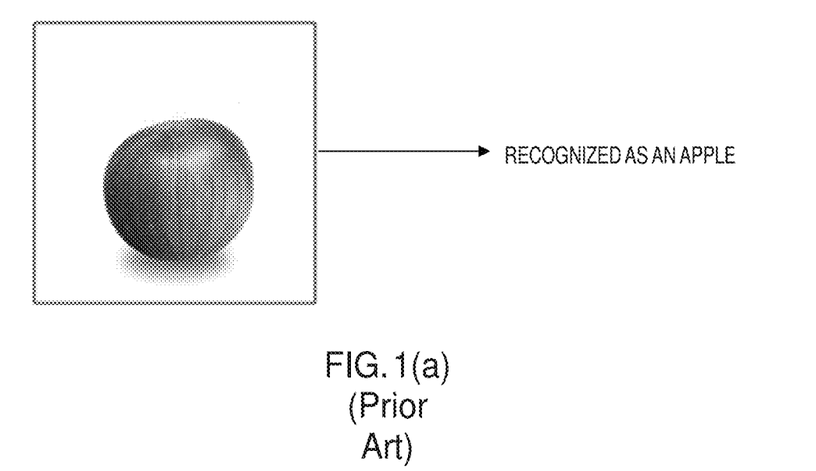
FIGS. 1(a) and 1(b) are examples in which the illumination colors are white light and dark red light.
Figure 1B:
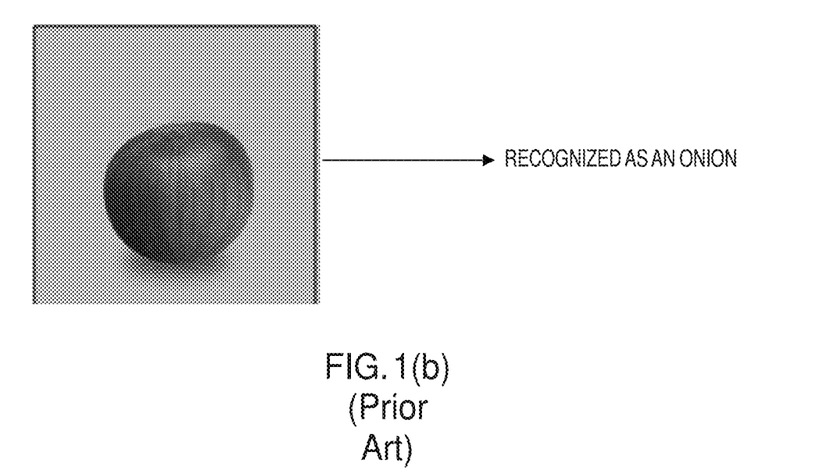

In the field of computer vision, color information is very important attribute information in still images and video images. When visual recognition is performed on a target in an image, a color of the recognized target is related to a color of the target itself (i.e., a color of light reflected by a surface of the target at the time of white light illumination) and an illumination color in the image. Taking the cases shown in FIG. 1(a) and FIG. 1(b) as examples, it is assumed that the target to be recognized in the image is a red apple (herein, FIG. 1(a) and FIG. 1(b) are black-and-white diagrams, the colors are just for purpose of illustration, rather than actual colors). When the apple is illuminated with white light (as illustrated in FIG. 1(a)), the color of the apple determined by the visual recognition is the color (red) of the apple itself, and therefore, it can be correctly recognized that the target in the image is an apple. However, when the apple is illuminated with dark red light (as illustrated in FIG. 1(b)), the color of the apple itself is superimposed with the dark red of the illumination light. At this time, the visually recognized color (for example, brown) of the apple is not the true color of the apple, and therefore, the apple may be mistakenly recognized as an onion.

In order to solve the error of visual recognition caused by the influence of the illumination color, it is feasible to remove the illumination color in the image (i.e., remove light projection existing in the image) and retain the color of the target itself in the image (i.e., a color of light reflected by a surface of the target at the time of white light illumination), so that the color of the target itself can be correctly recognized in the visual recognition.

A $FC^4$-based illumination color prediction method (hereinafter simply referred to as a $FC^4$ method) is a known illumination color prediction method. After the illumination color predicted by the $FC^4$ method is stripped from the original image, an image in a white light scene can be obtained, thereby improving the accuracy of visual recognition. The $FC^4$ method predicts the illumination color of the image based on semantic features in the image. However, if the image as a whole contains fewer semantic features, for example, the image contains a large area of single color or contains a target lacking structured information (such as a background wall, etc.), the illumination color predicted by this method is inaccurate.

The $FC^4$ method in the prior art proposes a confidence-based full convolutional network model. First, an image to be processed is input into a full convolutional network model. Then, after a convolution operation, activation processing and pooling processing are performed on the input image, a confidence degree (weight) is set for each region of the image, and primary illumination color prediction irrespective of the confidence degree is generated. Herein, a high confidence degree is set for a region which contains more semantic features, and a low confidence degree is set for a region which contains fewer semantic features. Final illumination color prediction is generated based on the set confidence degree and the primary illumination color prediction. After the illumination color prediction is performed on the image with the $FC^4$ method, the predicted illumination color is removed from the original image, so that the original image becomes an image in a white light scene. Thereafter, the visual recognition processing of target can be executed on the image in the white light scene.

The $FC^4$ method assumes that image regions containing different semantic features have different contributions in the illumination color prediction. The contribution degrees of different regions to the illumination color prediction are reflected by setting different confidence degrees for each region in the image, thereby predicting the illumination color with higher accuracy. For this reason, for an image containing many semantic features, for example, the target in the image is a person or an animal, or a target with significant structured information, such as a table, a chair, etc., the illumination color result predicted using the $FC^4$ method is trustworthy. However, for an image containing fewer semantic features, for example, a background wall with a single color, the confidence degree of each region in the image is basically identical, and the contribution degree to the illumination color prediction cannot be reflected based on the confidence degree. Therefore, the illumination color prediction for this type of images by the $FC^4$ method is inaccurate. After the illumination color with low accuracy is stripped from the original image, the obtained image is still obviously affected by the illumination color. Compared with a case of the real color after white light illumination, the difference can be observed intuitively and visually, which is disadvantageous to the result of visual recognition.

SUMMARY OF THE INVENTION

According to an aspect of the embodiments, there is provided a method for performing illumination color prediction on an image in a neural network model, comprising: inputting an image to the neural network model; extracting a semantic-based illumination color feature of the image and a statistical rule-based illumination color feature of the image; and predicting an illumination color of the image according to the semantic-based illumination color feature and the statistical rule-based illumination color feature.

According to another aspect of the embodiments, there is provided an image processing method comprising: predicting an illumination color of an image based on the aforementioned method for performing illumination color prediction on an image; removing the predicted illumination color from the image; performing a target recognition on the image from which the illumination color is removed.

According to another aspect of the embodiments, there is provided an image processing method comprising: predicting an illumination color of an image collected in real time in a viewfinder based on the aforementioned method for performing illumination color prediction on an image; automatically adjusting an exposure amount of capturing according to the predicted illumination color.

According to another aspect of the embodiments, there is provided an image processing method comprising: predicting an illumination color of an image based on the aforementioned method for performing illumination color prediction on an image; changing the predicted illumination color to be another different illumination color to obtain an image after the illumination color is changed.

According to another aspect of the embodiments, there is provided an apparatus for performing illumination color prediction on an image in a neural network model, comprising: an input unit configured to input an image to the neural network model; an extraction unit configured to extract a semantic-based illumination color feature of the image and a statistical rule-based illumination color feature of the image; a prediction unit configured to predict an illumination color of the image according to the semantic-based illumination color feature and the statistical rule-based illumination color feature.

According to another aspect of the embodiments, there is provided an image processing apparatus comprising: the aforementioned apparatus for performing illumination color prediction on an image; an illumination color removing unit configured to remove an illumination color predicted by the apparatus for performing the illumination color prediction on the image from the image; a recognition unit configured to perform a target recognition on the image from which the illumination color is removed.

According to another aspect of the embodiments, there is provided an image processing apparatus comprising: the aforementioned apparatus for performing illumination color prediction on an image; an exposure amount adjusting unit configured to automatically adjust an exposure amount of capturing, according to an illumination color of an image collected in real time in a viewfinder predicted by the apparatus for performing the illumination color prediction on the image.

According to another aspect of the embodiments, there is provided an image processing apparatus comprising: the aforementioned apparatus for performing illumination color prediction on an image; an illumination color changing unit configured to change an illumination color predicted by the apparatus for performing the illumination color prediction on the image to be another different illumination color to obtain an image after the illumination color is changed.

According to another aspect of the embodiments, there is provided a computer-readable storage medium storing a computer program, which causes a processor to execute steps of the above method for performing illumination color prediction on an image, when being executed by the processor.

Further features of the present disclosure will become apparent from the following description of exemplary embodiments with reference to the accompanying drawings.

BRIEF DESCRIPTION OF THE DRAWINGS

The above and other objects and benefits of embodiments of the present disclosure are further described below in conjunction with specific embodiments and with reference to the accompanying drawings. In the drawings, identical or corresponding technical features or components will be denoted by identical or corresponding reference numerals.

DESCRIPTION OF THE EMBODIMENTS

Exemplary embodiments of the present disclosure will be described hereinafter in conjunction with the accompanying drawings. In the purpose of clarity and conciseness, not all features of the embodiments are described in the specification. However, it should be understood that many settings specific to embodiments are to be made in the implementation of the embodiments in order to achieve specific objects of the developer. For example, constraints related to devices and businesses are in conformity, and these constraints may change depending on different embodiments. Moreover, it should also be understood that development work may be very complex and time consuming, but such development work is merely a routine task for those skilled in the art who are benefit from contents of the present disclosure.

Herein, it should also be noted that, in order to avoid the present disclosure from being obscured due to unnecessary details, only processing steps and/or system structures that are closely related to the solutions at least according to the present disclosure are shown in the drawings, and other details that have litter relation to the present disclosure are omitted.

In order to improve the accuracy of illumination color prediction for an image, the present disclosure proposes an optimized illumination color prediction method. On the one hand, a semantic feature is extracted from an image, on the other hand, a statistical rule feature is also extracted from the image, and the illumination color of the image is predicted based on both the semantic feature and the statistical rule feature. By using the illumination color prediction method of the present disclosure, not only the influence of semantic features in the image containing more semantic features on the illumination color is considered, but also the statistical rule in the image containing fewer semantic features is considered, thereby improving the accuracy of the prediction result of illumination color.

Figure 2:
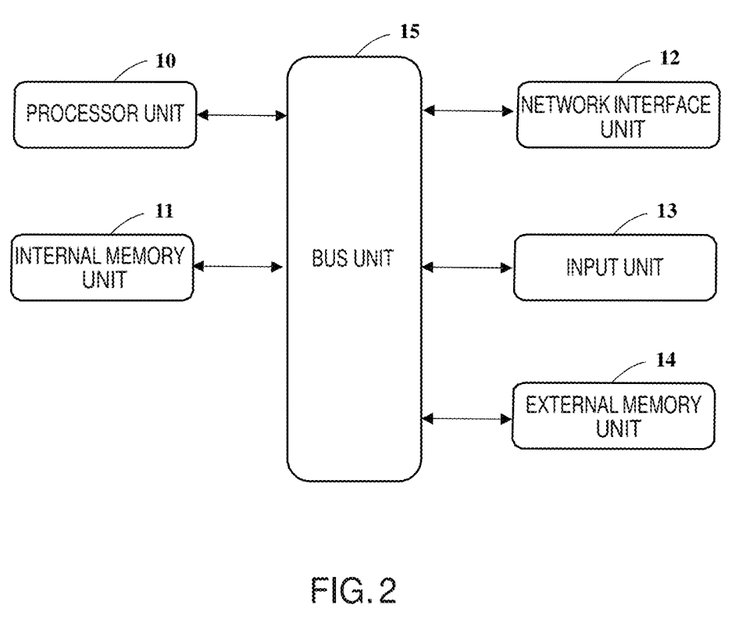
FIG. 2 is a schematic diagram of hardware for operating an illumination color prediction method of the present disclosure.

The illumination color prediction method proposed by the present disclosure can be applied in a multi-layer neural network model. FIG. 2 shows a hardware environment in which the multi-layer neural network model is operated, and which includes a processor unit 10, an internal memory unit 11, a network interface unit 12, an input unit 13, an external memory unit 14 and a bus unit 15.

The processor unit 10 may be a CPU (Central Processing Unit) or a GPU (General Processing Unit). The internal memory unit 11 includes a random access memory (RAM) and a read only memory (ROM). The RAM can be used as a main memory, a work area, and the like of the processor unit 10. The ROM can be used to store a control program of the processor unit 10, and can also be used to store files or other data to be used when operating the control program. The network interface unit 12 can be connected to a network and implement network communication. The input unit 13 controls input from devices such as a keyboard, a mouse, and the like. The external memory unit 14 stores a startup program, various applications, and the like. The bus unit 15 is used to connect each of the units with each other.

The hardware structure shown in FIG. 2 is merely illustrative and is not intended to limit the disclosure, its application or its use. The hardware structure shown in FIG. 2 can be implemented in any embodiment, can be used as a stand-alone computer, or can also be used as a processing system in the device. One or more unnecessary components can be removed, or one or more additional components can be added to the hardware structure.

Hereinafter, each of embodiments of the present disclosure will be described in detail with reference to the accompanying drawings.

First Exemplary Embodiment

Figure 3:
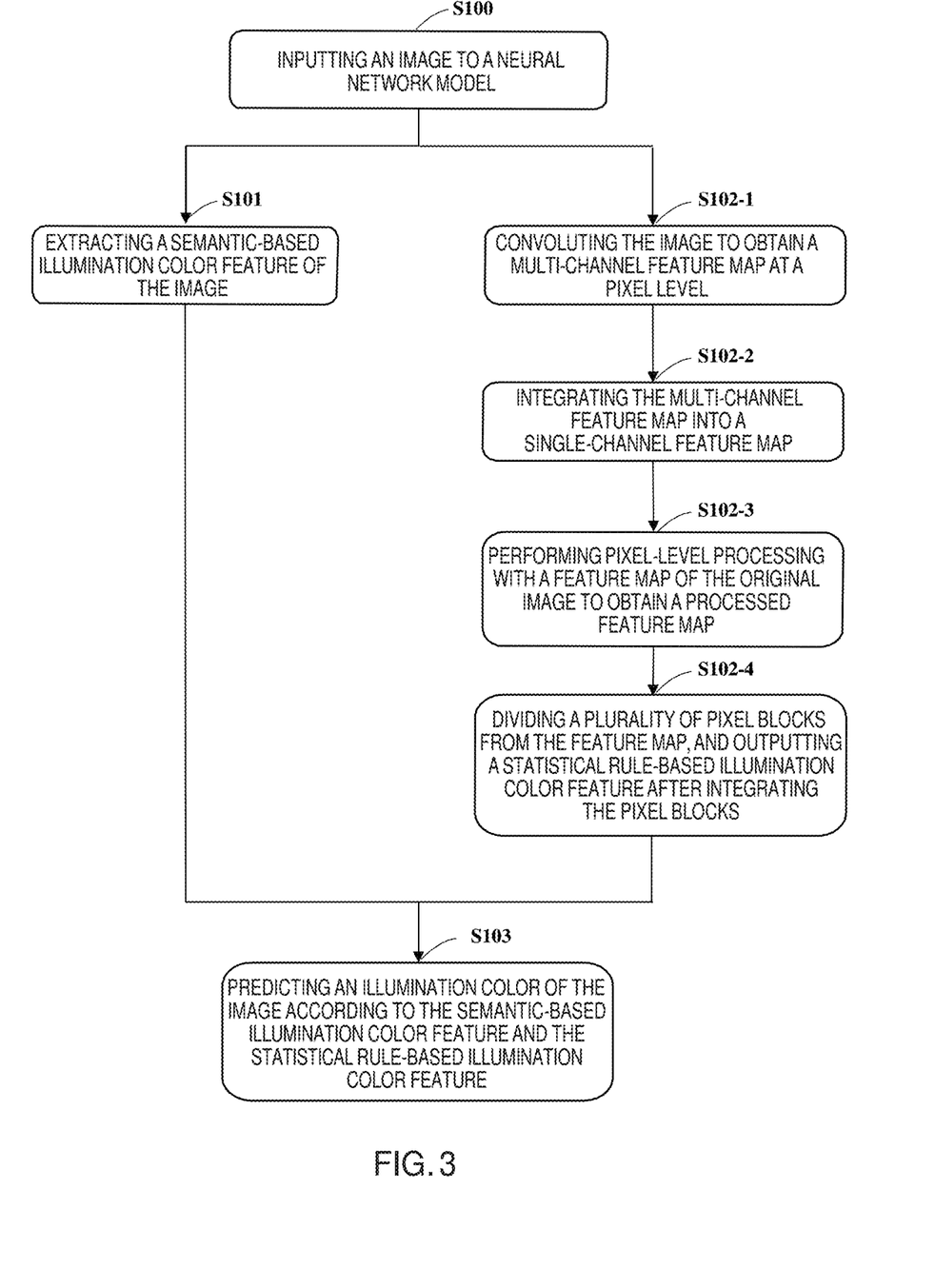
FIG. 3 is a flow chart schematically showing steps of the illumination color prediction method of a first exemplary embodiment of the present disclosure.

FIG. 3 describes a flow chart schematically showing steps of the illumination color prediction method of the first exemplary embodiment of the present disclosure. In the first embodiment, the illumination color prediction processing flow shown in FIG. 3 is implemented by using the RAM as a work memory and causing the CPU 10 to execute an illumination color prediction program stored in the ROM and/or the external memory unit 14.

Step S100: An image is input to the neural network model.

The images (or image data) described in each of embodiments of the present disclosure may be a still image, and can also be a video image, and the present disclosure does not limit the type of the image to be processed.

The neural network model in which the illumination color prediction method proposed by the present disclosure is applied may be a convolutional neural network model, and the present disclosure does not limit the structure and type of the neural network model.

Step S101: A semantic-based illumination color feature of the image output by the neural network model is extracted.

The illumination color feature described in each of embodiments of the present disclosure may be a feature in a RGB-based three-dimensional color space. However, the present disclosure may also extract corresponding semantic-based illumination color features for other color spaces, and the present disclosure does not limit this.

In this step S101, the $FC^4$ method may be used to extract the semantic-based illumination color feature, and after a series of convolution operations, activation processing and pooling processing, the semantic-based illumination color feature is extracted from the image. Taking the neural network model shown in FIG. 4 as an example, it is assumed that the parameters of the convolutional neural network model for extracting the semantic-based illumination color feature are as follows: a convolution kernel is 3×3×64, a step size is 2×2, and the pooling processing has a maximum value of 3×3 (maximum pooling). After the operations of three sets of convolution module groups shown in FIG. 4, the semantic-based illumination color feature is output. Herein, in order to make the operation simple and convenient, in a case of taking the RGB image space as an example, the illumination color feature of 1×1×4 is output, wherein in addition to three channels respectively for R (red), G (green), and B (blue), there is also one channel for the confidence degree set in the $FC^4$ method.

Step S102: A statistical rule-based illumination color feature of the image output by the neural network model is extracted.

The manner of implementing this step S102 will be described below. It should be explained that the following is only a method of implementing step S102, but not an indispensable method.

Step S102-1: The convolution operation is performed on the image to obtain a multi-channel feature map at a pixel level.

Figure 4:
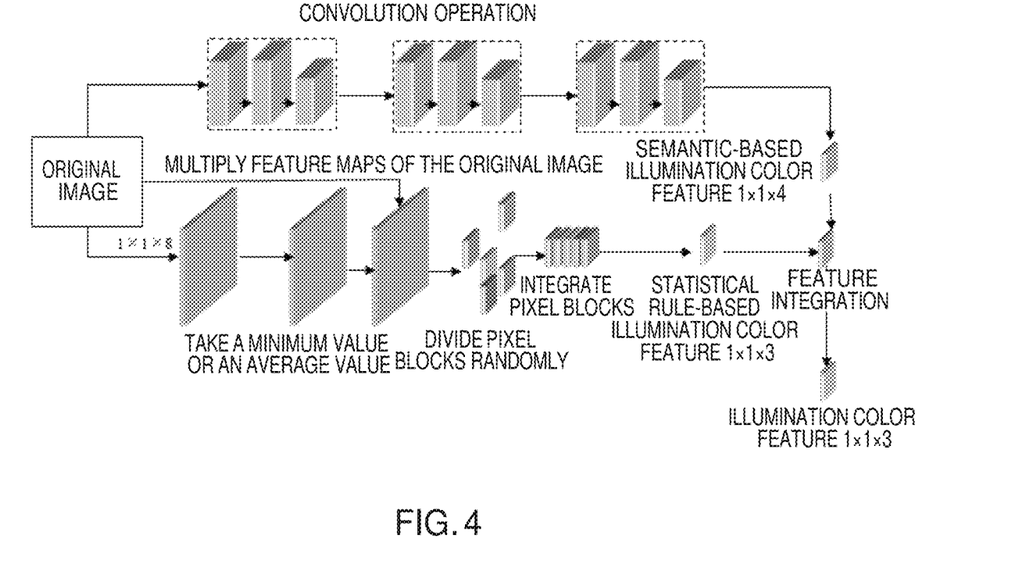
FIG. 4 is an example of a network model of the first exemplary embodiment of the present disclosure.

In order to simplify the operation, in the neural network model shown in FIG. 4, after the convolution operation is performed on the image in a convolution layer in which the convolution kernel is 1×1×8, an 8-channel feature map is obtained.

Step S102-2: The multi-channel feature map is integrated into a single-channel feature map.

In this step S102-2, in units of pixel points in the feature map, the minimum pixel value (or average pixel value) of a plurality of channels corresponding to each pixel point is taken as the value of the pixel point, and the single-channel feature map is obtained.

Step S102-3: A pixel-level processing is performed on the feature map obtained in step S102-2 and the feature map of the original image to obtain a feature map at the pixel level.

The pixel-level processing herein may be a processing of adding, multiplying or averaging pixels of the feature map obtained in step S102-2 and pixels of the feature image of the original image bit by bit.

The above steps S102-2 and S102-3 are steps for implementing the first embodiment. In the first embodiment, steps S102-2 and S102-3 may not be executed, but the processing directly proceeds to step S102-4 based on the feature map obtained in step S102-1.

Step S102-4: A plurality of pixel blocks is divided from the feature map obtained in step S102-3, and the statistical rule-based illumination color feature is output after the divided pixel blocks are integrated.

Herein, for the divided plurality of pixel blocks, pixel values of pixel points at the same position may be added (or multiplied or averaged) in units of pixel points to obtain an integrated pixel block. The integrated pixel block is then subjected to a convolution operation to obtain the statistical rule-based illumination color feature. Herein, in order to make the operation simple and convenient, in a case of taking the RGB image space as an example, an illumination color feature of 1×1×3 is output.

In this step S102-4, the pixel blocks may be divided in units of pixels in a random manner, and the divided pixel blocks may be integrated. The purpose of doing this is as follows: for an image that contains less semantic information or an image that lacks structured information, the prediction result of illumination color predicted by, for example, the $FC^4$ method, is inaccurate, and therefore, the spatial association between adjacent pixel points (pixel blocks) in the image is broken in a random manner, the interference of the non-main color is excluded, and the main color in the image is determined based on the statistical rule, so that the prediction result of illumination color of the image is more accurate.

It should be explained that, in the first embodiment, the spatial association between adjacent pixel points can be broken by obtaining blocks in a random manner, the blocks can also be successively obtained in a positional order according to the preset step size, and the divided pixel blocks are randomly arrayed during integration, which can also achieve the purpose of breaking the spatial association between adjacent pixel points.

The present disclosure does not limit the size of the divided pixel blocks. For example, if the feature map to be divided is 100×100 (pixels), the divided pixel blocks may include 3×3 pixel blocks, 1×1 pixel block, 10×10 pixel block, etc. Of course, the present disclosure is not limited to the case where the sizes of the divided plurality of pixel blocks are identical.

The present disclosure does not limit the number of the divided pixel blocks. Of course, considering the accuracy of the statistical result, the ratio of the number of the pixel points divided into pixel blocks to the number of all pixel points in the feature map can be set to be not less than a predetermined ratio. Further, it is considered that the same pixel point can be repeatedly divided into different pixel blocks, and therefore, the ratio of the number of the non-repeated pixel points divided into pixel blocks to the number of all pixel points in the feature map can be set to be not less than the predetermined ratio. For example, the ratio of the number of the non-repeated pixel points divided into pixel blocks to the number of all pixel points in the feature map is not less than 70%, in other words, more than 70% of the pixel points in the feature map are to be divided into pixel blocks used for integration. Taking a feature map of 100×100 pixel points as an example, 900 pieces of 3×3 pixel blocks can be divided, and the 900 pieces of pixel blocks do not overlap each other; in another example, 1000 pieces of 3×3 pixel blocks can be divided and there are partially or completely overlapped pixel blocks in the 1000 pieces of 3×3 pixel blocks.

In this embodiment, the execution order of step S101 and step S102 is not fixed. That is, step S101 can be first executed to extract the semantic-based illumination color feature, and then step S102 is executed to extract the statistical rule-based illumination color feature, alternatively, the step of extracting the statistical rule-based illumination color feature can be first executed, and then the step of extracting the semantic-based illumination color feature can be executed, still alternatively, step S101 and step S102 can be executed in parallel to simultaneously extract the semantic-based illumination color feature and the statistical rule-based illumination color feature.

Step S103: The illumination color of the image is predicted according to the semantic-based illumination color feature and the statistical rule-based illumination color feature.

Still taking the neural network model shown in FIG. 4 as an example, asemantic-based illumination color feature of 1×1×4 is output from the branch of step S101, and a statistical rule-based illumination color feature of 1×1×3 is output from the branch of step S102. The semantic-based illumination color feature and the statistical rule-based illumination color feature are integrated. Herein, the integration can be a direct integration of two features, and can also be an integration based on weights after assigning weights to different features. The present disclosure does not limit the integration method of the features. Since the number of channels of the illumination color features of the two branches is different, the illumination color features can be integrated after the number of channels of the illumination color features of the two branches is combined into a single channel. Other methods, such as a channel extension (copy) and the like, can also be used, so that after the channels of the illumination color features of the two branches are identical, the integration is performed to obtain the prediction result of illumination color.

The illumination color prediction method based on the first embodiment of the present disclosure can not only more accurately predict an illumination color of an image containing more semantic features, but also accurately estimate an illumination color of an image containing fewer semantic features according to a main color of the image determined according to the statistical rule. Further, when the statistical rule-based illumination color feature is extracted, the spatial correlation between adjacent pixel points (pixel blocks) in the image is broken, and the interference of the non-main color is excluded, thereby ensuring the accuracy of the illumination color of the predicted image.

Second Exemplary Embodiment

The second exemplary embodiment of the present disclosure is an Automatic White Balance (AWB) processing procedure. After an image I illuminated with colored light is predicted by the method of the first exemplary embodiment to obtain an illumination color L of the image I, the predicted illumination color L is removed from the image I, and a white balance image is obtained. Herein, the method of removing the predicted illumination color may employ a method known in the art, and the present disclosure does not limit the method of removing the predicted illumination color. The second embodiment is intended to correct an image illuminated with colored light to be an image illuminated with white light. As an embodiment of color correction, a white balance image can be obtained by the method of the second embodiment. Thereafter, processing such as target recognition or the like can be executed on the white balance image, so that the accuracy of the target recognition can be improved.

Third Exemplary Embodiment

The third exemplary embodiment of the present disclosure is based on the first exemplary embodiment, and executes an appropriate Automatic Exposure (AE) according to the predicted illumination color. In the third embodiment, an image collected in real time in a viewfinder of the camera is used as the image processed in the first exemplary embodiment, and illumination color prediction of the image is obtained as a current illumination color in the viewfinder. According to the current illumination color in the viewfinder, the exposure amount of capturing is automatically adjusted so that the exposure result of the image captured by the camera is appropriate.

Fourth Exemplary Embodiment

The fourth exemplary embodiment of the present disclosure is based on the first exemplary embodiment, and according to the predicted illumination color, changes the illumination color as needed to obtain the image after the illumination color is changed. After an image illuminated with a first illumination color is predicted by the method of the first exemplary embodiment to obtain the first illumination color of the image, the first illumination color is changed to a second illumination color as needed. For example, a RGB value of red light as the first illumination color is changed to a RGB value of yellow light as the second illumination color, thereby achieving the change in the illumination color of the image. One application scene of the fourth embodiment is a filter change in the camera capturing.

Fifth Exemplary Embodiment

Figure 5:
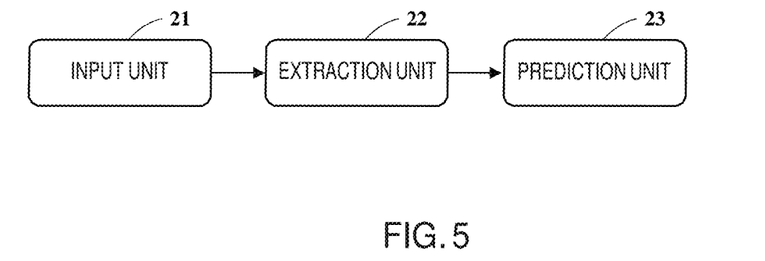
FIG. 5 is a structure schematic view of an apparatus of a fifth exemplary embodiment of the present disclosure.

The fifth exemplary embodiment of the present disclosure discloses an apparatus for performing illumination color prediction on an image, which belongs to the same inventive concept as the first exemplary embodiment. As shown in FIG. 5, the apparatus includes: an input unit 21, an extraction unit 22 and a prediction unit 23, wherein the input unit 21 inputs an image to a neural network model; the extraction unit 22 extracts a semantic-based illumination color feature of the image and a statistical rule-based illumination color feature of the image; the prediction unit 23 predicts an illumination color of the image based on the semantic-based illumination color feature and the statistical rule-based illumination color feature.

Each unit described above is also capable of executing each of the steps in the first exemplary embodiment of the present disclosure, and the details thereof will not be described herein again.

The present disclosure also discloses an image processing apparatus which belongs to the same inventive concept as the second, third, and fourth exemplary embodiments, and the details thereof will not be described herein again.

Other Embodiments

Embodiment(s) of the disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Embodiments of the disclosure can also be realized by the following method, that is, a software (program) that executes the functions of the above-described embodiments is supplied to a system or apparatus through a network or various storage medium, a computer of the system or apparatus, or a central processing unit (CPU) and a micro processing unit (MPU), reads and executes the program.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A method for performing illumination color prediction on an image in a neural network model, comprising:
    inputting an image to the neural network model;
    extracting a semantic-based illumination color feature of the image and a statistical rule-based illumination color feature of the image; and
    predicting an illumination color of the image according to the semantic-based illumination color feature and the statistical rule-based illumination color feature,
    wherein, when the statistical rule-based illumination color feature is extracted, a spatial correlation between adjacent pixel points in the image is broken.

2. The method according to claim 1, wherein extracting the statistical rule-based illumination color feature of the image comprises of:
    dividing a plurality of pixel blocks randomly from a feature map of the image; and
    obtaining the statistical rule-based illumination color feature of the image by integrating the divided pixel blocks.

3. The method according to claim 2, wherein integrating the divided pixel blocks comprises of:
    obtaining an integrated pixel block by adding or multiplying or averaging pixel values of pixel points of the divided pixel blocks at a same position.

4. The method according to claim 2, wherein a ratio of a number of pixel points divided into the pixel blocks to a number of all pixel points in the feature map of the image is not less than a predetermined ratio.

5. The method according to claim 2, wherein pixel points between a plurality of the divided pixel blocks do not overlap at all, or there are partially or completely overlapped pixel blocks.

6. An image processing method comprising:
    predicting an illumination color of an image according to a semantic-based illumination color feature and a statistical rule-based illumination color feature;
    removing the predicted illumination color from the image; and
    performing a target recognition on the image from which the illumination color is removed,
    wherein, when the statistical rule-based illumination color feature is extracted, a spatial correlation between adjacent pixel points in the image is broken.

7. An image processing method comprising:
    predicting an illumination color of an image collected in real time in a viewfinder according to a semantic-based illumination color feature and a statistical rule-based illumination color feature; and
    automatically adjusting an exposure amount of capturing according to the predicted illumination color,
    wherein, when the statistical rule-based illumination color feature is extracted, a spatial correlation between adjacent pixel points in the image is broken.

8. An image processing method comprising:
    predicting an illumination color of an image according to a semantic-based illumination color feature and a statistical rule-based illumination color feature; and
    changing the predicted illumination color to other different illumination color to obtain an image after the illumination color is changed,
    wherein, when the statistical rule-based illumination color feature is extracted, a spatial correlation between adjacent pixel points in the image is broken.

9. An apparatus for performing illumination color prediction on an image in a neural network model, comprising:
    at least one processor; and
    a memory that stores a program which, when executed by the at least one processor, causes the processor to function as:
    an input unit configured to input an image to the neural network model;

an extraction unit configured to extract a semantic-based illumination color feature of the image and a statistical rule-based illumination color feature of the image; and a prediction unit configured to predict an illumination color of the image based on the semantic-based illumination color feature and the statistical rule-based illumination color feature, wherein, when the statistical rule-based illumination color feature is extracted, a spatial correlation between adjacent pixel points in the image is broken.

10. The apparatus according to claim 9, wherein the extraction unit comprises of:
  a divider configure to divide a plurality of pixel blocks randomly from a feature map of the image; and
  an obtaining unit configured to obtain the statistical rule-based illumination color feature of the image by integrating the divided pixel blocks.

11. The apparatus according to claim 10, the obtaining unit further configured to obtain an integrated pixel block by adding or multiplying or averaging pixel values of pixel points of the divided pixel blocks at a same position.

12. The apparatus according to claim 10, wherein a ratio of a number of pixel points divided into the pixel blocks to a number of all pixel points in the feature map of the image is not less than a predetermined ratio.

13. An image processing apparatus, comprising:
  at least one processor; and
  a memory that stores a program which, when executed by the at least one processor, causes the processor to function as:
  a prediction unit configured to predict an illumination color of an image based on an extracted semantic-based illumination color feature and an extracted statistical rule-based illumination color feature;
  an illumination color removing unit configured to remove, from the image, the illumination color predicted by the prediction unit; and
  a recognition unit configured to perform a target recognition on the image from which the illumination color is removed,
  wherein, when the statistical rule-based illumination color feature is extracted, a spatial correlation between adjacent pixel points in the image is broken.

14. An image processing apparatus, comprising:
  at least one processor; and
  a memory that stores a program which, when executed by the at least one processor, causes the processor to function as:
  a prediction unit configured to predict an illumination color of an image based on an extracted semantic-based illumination color feature and an extracted statistical rule-based illumination color feature; and
  an exposure amount adjusting unit configured to automatically adjust an exposure amount of capturing, according to an illumination color of an image collected in real time in a viewfinder predicted by the prediction unit;

wherein, when the statistical rule-based illumination color feature is extracted, a spatial correlation between adjacent pixel points in the image is broken.

15. An image processing apparatus, comprising:
  at least one processor; and
  a memory that stores a program which, when executed by the at least one processor, causes the processor to function as:
  a prediction unit configured to predict an illumination color of an image based on an extracted semantic-based illumination color feature and an extracted statistical rule-based illumination color feature; and
  an illumination color changing unit configured to change the illumination color predicted by the prediction unit to other different illumination color to obtain an image after the illumination color is changed,
  wherein, when the statistical rule-based illumination color feature is extracted, a spatial correlation between adjacent pixel points in the image is broken.

16. A non-transitory computer-readable storage medium, on which a computer program is stored, and the computer program, when being executed by a processor, causes the processor to execute a method, the method comprising:
  inputting an image to a neural network model;
  extracting a semantic-based illumination color feature of the image and a statistical rule-based illumination color feature of the image; and
  predicting an illumination color of the image according to the semantic-based illumination color feature and the statistical rule-based illumination color feature,
  wherein, when the statistical rule-based illumination color feature is extracted, a spatial correlation between adjacent pixel points in the image is broken.

17. The non-transitory computer-readable storage medium according to claim 16, wherein extracting the statistical rule-based illumination color feature of the image comprises of:
  dividing a plurality of pixel blocks randomly from a feature map of the image; and
  obtaining the statistical rule-based illumination color feature of the image by integrating the divided pixel blocks.

18. The non-transitory computer-readable storage medium according to claim 17, wherein integrating the divided pixel blocks comprises of:
  obtaining an integrated pixel block by adding or multiplying or averaging pixel values of pixel points of the divided pixel blocks at a same position.

19. The non-transitory computer-readable storage medium according to claim 17, wherein a ratio of a number of pixel points divided into the pixel blocks to a number of all pixel points in the feature map of the image is not less than a predetermined ratio.

20. The non-transitory computer-readable storage medium according to claim 17, wherein pixel points between a plurality of the divided pixel blocks do not overlap at all, or there are partially or completely overlapped pixel blocks.

* * * * *